United States Patent [19]

Umeda et al.

[11] 3,989,301
[45] Nov. 2, 1976

[54] DEVICE FOR ADJUSTING ROTATING ANGLE OF VESSEL OF DUMP TRUCK

[75] Inventors: Haruhiko Umeda; Hiroshi Ito, both of Yokohama; Tadatoshi Mizuno, Tokyo; Yoshiaki Harita, Yokohama, all of Japan

[73] Assignee: Kabushiki Kaisha Komatsu Seisakusho, Tokyo, Japan

[22] Filed: Mar. 10, 1975

[21] Appl. No.: 557,025

Related U.S. Application Data

[63] Continuation-in-part of Ser. No. 473,902, May 28, 1974, abandoned.

[30] Foreign Application Priority Data

Oct. 27, 1973    Japan.............................. 48-124097

[52] U.S. Cl............................... 298/22 C; 214/501; 91/382; 91/389
[51] Int. Cl.²........................................... B60P 1/16
[58] Field of Search................... 214/500, 501–504, 214/138 R, 762–764, 771; 91/382, 389; 298/35 M, 22 R, 22 AE, 22 C, 22 F, 22 J, 22 P, 22 B, 22 D

[56] References Cited
UNITED STATES PATENTS
2,667,793    2/1954    Webster........................ 298/22 C X
FOREIGN PATENTS OR APPLICATIONS
1,158,384    11/1963    Germany........................... 298/22 C
1,204,079    10/1965    Germany........................... 298/22 C

*Primary Examiner*—Frank E. Werner
*Attorney, Agent, or Firm*—Armstrong, Nikaido & Wegner

[57] ABSTRACT

A device for adjusting the rotating angle of a vessel of a dump truck which includes a detent having a guide recess, which is pivotally connected to the vehicle body said detent being connected to a spool of a control valve operated by an operating lever. An arm is pivotally connected to the vehicle body and has a cam follower journaled therein, and another arm is secured to the rod of a cylinder and has a bolt which is secured to said another arm and is adjustable in height. Thus, the shock is absorbed when the vessel is travelling upwards and is stopped.

10 Claims, 9 Drawing Figures

1

DEVICE FOR ADJUSTING ROTATING ANGLE OF VESSEL OF DUMP TRUCK

CROSS REFERENCE TO RELATED APPLICATION

This application is a continuation-in-part application of our prior U.S. Patent Application Ser. No. 473,902 filed May 28, 1974, now abandoned.

BACKGROUND OF THE INVENTION

This invention relates to a dump truck, and more particularly to a device for adjusting the rotating angle of a vessel of the dump truck.

It is an object of the present invention to provide a device for adjusting the rotating angle of a vessel of a dump truck to optionally select the position of the vessel of the truck.

It is another object of the present invention to provide a device for adjusting the rotating angle of a vessel of a dump truck which may further raise the vessel after the vessel is once stopped at a selected position, and which may also reduce the shock when an upward travelling of the vessel is stopped.

BRIEF DESCRIPTION OF THE DRAWINGS

These and other objects, features and advantages of the device for adjusting the rotating angle of the vessel of the dump truck according to the present invention will become more apparent from the following description taken in conjunction with the accompanying drawings, in which.

DESCRIPTION OF THE PREFERRED EMBODIMENTS

Figure 1:
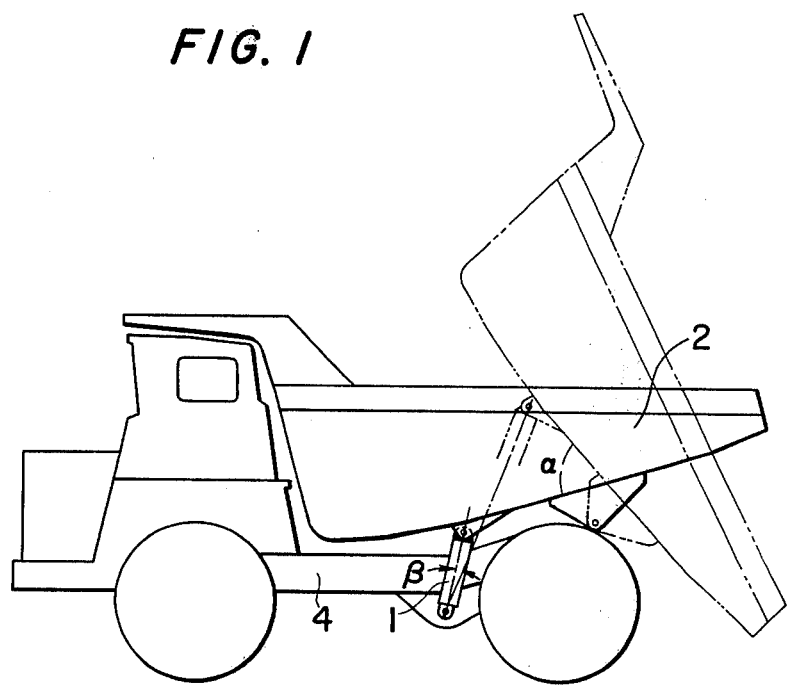
FIG. 1 is a side elevational view of the dump truck provided with a device for adjusting rotating angle of a vessel thereof according to the present invention.
Figure 3:
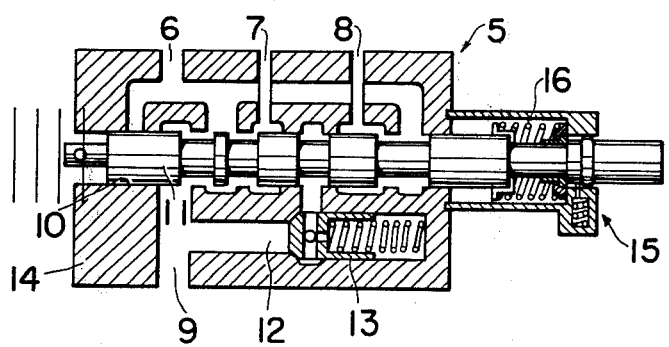
FIG. 3 is a longitudinal sectional view of the control valve for use in the device of the invention.

The present invention will be hereinafter described in detail with reference to the accompanying drawings, wherein like reference numerals and characters designate identical, or corresponding parts throughout views.

Reference is now made to FIGS. 1 to 4B, which are views of a first embodiment of a device for adjusting a rotating angle of a vessel of a dump truck according to the first aspect of the present invention, reference numeral 1 represents a cylinder, the bottom portion of which is pivotally connected through a pivotal pin and a bracket to a vessel 2 of the dump truck. Piston rod 3 of which one end thereof is slidably inserted into the cylinder 1 is pivotally secured to a frame 4 of the dump truck. Reference numeral 5 denotes a control valve. This control valve 5 has a tank port 6, connecting ports 7 and 8 and a pump port 9 in a valve body 14 thereof, and further contains a spool 11 in a hole 10 thereof. The control valve comprises a check valve 13 disposed in a passage 12a for communicating the pump port 9 with the connecting port 8 and further a detent mechanism 15 mounted on the valve body 14 for positioning the "floating" position of the spool 11. The spool 11 is biased to the left by means of by a spring 16. The rod 3 of the cylinder 1 has formed therein a connecting port 17 which communicates with the bottom chamber 1a and a connecting port 18 which communicates with the head chamber 1b. The connecting port 17 is connected through a conduit 19 with the connecting port 8, whilst the connecting port 18 is connected through a conduit 20 with the connecting port 8. Secured to the rod 3 of the cylinder 1 is an arm 21, to which female screw member 22 is secured. A bolt 23 which is used as a lifting means is screwed with the female screw member 22, and a nut 24 is screwed to the bolt 23 for adjusting the height of the bolt. A detent 25 is pivotally connected to the vehicle body 30 by means of a pin 26 and a guide recess 36 is formed at the cam portion 25a of the detent 25.

The spool 11 of the control valve 5 is connected through a rod 27 to an operating lever 28, and the rod 27 is connected to the detent 25 with a pin 29. A bracket 31 projects from the vehicle body 30, and has an arm 32 pivotally connected thereto with a pin 33. A cam follower 34 is carried by the arm 32, and the arm 32 is urged by a spring 35 toward the detent 25 in a manner such that the cam follower 34 is engaged with the cam portion 25a of the detent 25.

In operation of the device, thus constructed for adjusting the rotating angle of the vessel of the dump truck, when the operation lever 28 is moved to "upward" position, the rod 27 is moved to the left in the drawing, and the detent 25 is rotated in the direction as designated by an arrow so that the cam follower 34 of the arm 32 forced into the guide recess 36. As a result, even if the operating lever 28 is released, this operation lever 28 is not returned by the action of the spring 35. At the same time, the spool 11 is moved to the left so that the hydraulic oil from the pump urges the check valve 13 upwards to pass through the passage 12a into the connecting port 8 and then enter through the conduit 19 into the bottom chamber 1a of the cylinder 1. As a consequence, the hydraulic oil within the head chamber 1b is returned through the conduit 20, the connecting port 7 and the tank port 6 into the tank. Thus, the cylinder 1 is extended so that the vessel 2 is raised. This cylinder 1 is inclined at an angle $\beta$ when it is extended as shown in FIG. 1. Therefore, the arm 21 secured to the rod 3 is rotated in the direction as shown by an arrow by the inclination of the cylinder 1 so that the bolt 23 is brought into contact with the arm 32. As a result, the arm 32 is rotated about the pin 33. Accordingly, the cam follower 34 is disengaged from the guide recess 36. Therefore, the spool 11 is returned to "hold" position by the action of the spring 16, while the operating lever 28 is returned to "hold" position by the rod 27. Accordingly, the passage 12a from the pump port 9 to the connecting port 8 and the passage 12b from the connecting port 8 to the tank port 6 are shut off so that the cylinder 1 is held at its raised position. Then, the position of the vessel 2 can be optionally selected by adjusting the height of the bolt 23.

When it is intended to raise again the vessel 2 once stopped at certain position, the operating lever 28 is moved to "upward" position, thereby the vessel 2 is moved upwards until the lever 28 is released.

Figure 4A:
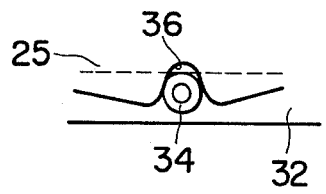
FIGS. 4A and 4B are explanatory views of the operation of the detent and cam follower for use in the device of the invention.
Figure 4B:
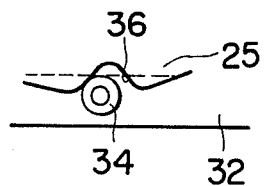
Figure 2:
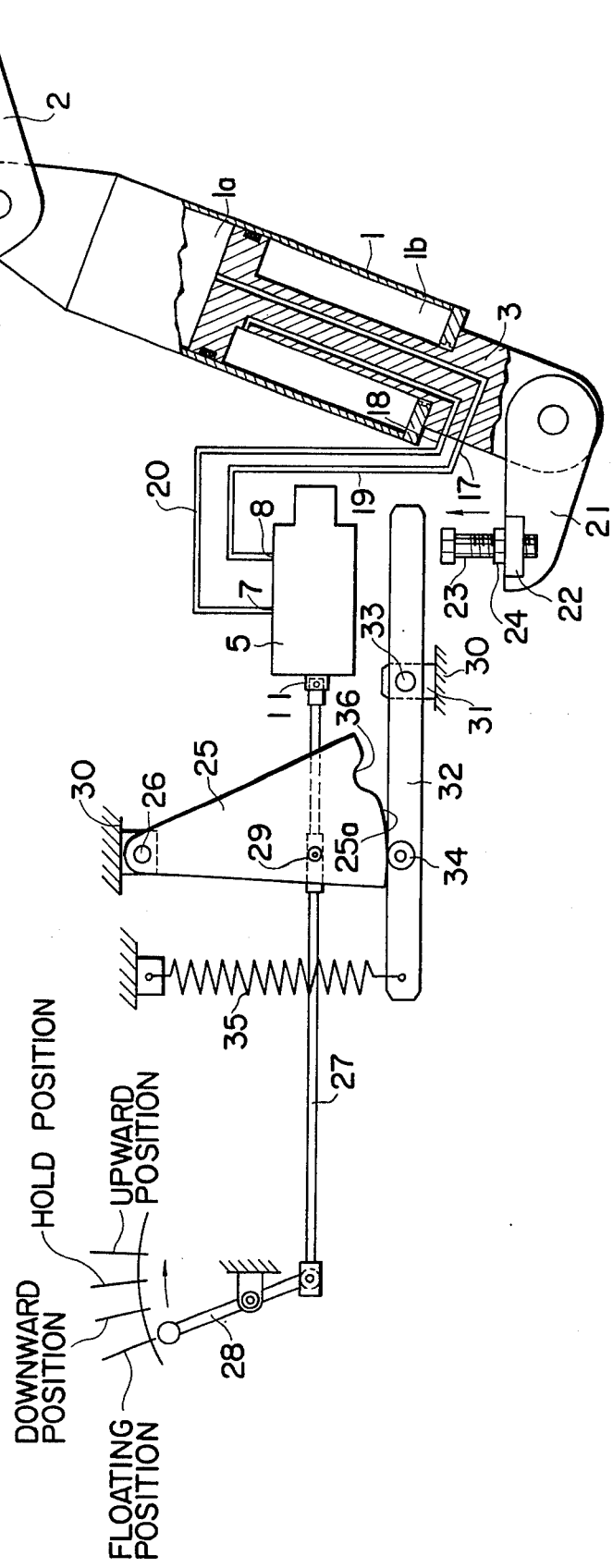
FIG. 2 is a view for explaining the structure according to a first embodiment of the device of the present invention.

When the vessel 2 is moved upwards, the cam follower 34 engaged with the guide recess 36 of the detent 25 as shown in FIG. 4A moves downwards as shown in FIG. 4B. Thus, the cam follower 34 is disengaged from the guide recess 36 so that the detent 25 is gradually moved in the direction as shown by an arrow. Therefore, the spool 11 is returned to "hold" position by the action of the spring 16, so that the hydraulic oil is throttled by the spool 11 thereby absorbing the shock when the vessel 2 is stopped.

As is clear from the foregoing, the device for adjusting the rotating angle of the vessel of the dump truck comprises a detent 25 having a guide recess 36 in a cam portion 25a which is pivotally secured to the vehicle body. The detent 25 is connected to a spool 11 of a control valve 5 operated by an operating lever 28. An arm 32 is pivotally connected to the vehicle body, and has a cam follower 34, journaled therein, said arm 32 is urged by a spring 35 to engage the cam follower 34 with the cam portion 25a. An arm 21 is secured to the rod 3 of the cylinder 1 and has a bolt 23 fixedly secured to the arm 21 and is adjustable in height, said bolt 23 being arranged to rock the arm 32 upwards against the action of the spring 35 when the cylinder 1 is extended. The arm 32 is rocked by the bolt 23 having an adjusted height by the extension of the cylinder 1 when the vessel is raised so that the cam follower 34 is disengaged from the guide recess 36, and the spool 11 is returned from "upward" position to "hold" position by the action of the spring contained within the control valve. The result is that the cylinder 1 is held at its raised position thereby stopping the vessel moving upwards. Therefore, it will be understood that the position of the vessel can be selected by adjusting the height of the bolt 23, and further the vessel once stopped at a selected position may be further raised, and the shock when the vessel travelling upwards is stopped may be absorbed and reduced.

Referring to FIGS. 5 to 8, other embodiments according to the present invention are hereinafter described.

Figure 5:
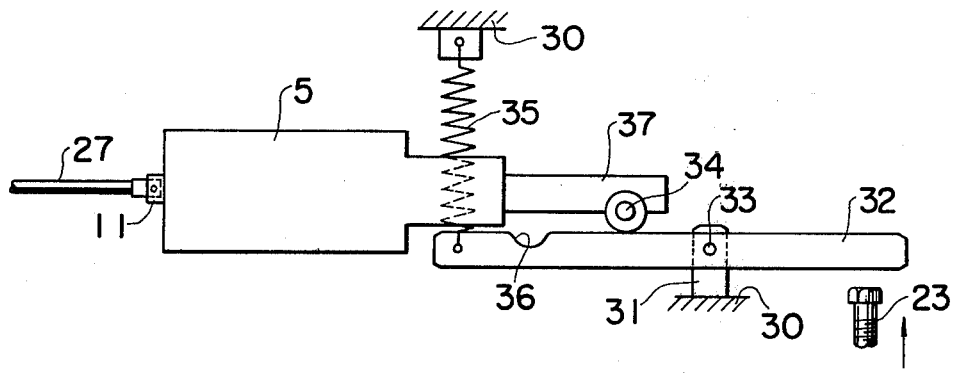
FIGS. 5 to 8 are fragmental views of other embodiments of the present invention.

A second embodiment of the device for adjusting the rotating angle of the vessel of the dump truck is shown in FIG. 5 in which the cam follower 34 is rotatably secured to a member 37 directly connected to the valve spool 11, and the arm 32 serves as a detent means also in place of the detent 25 used in the aforesaid first embodiment, that is, in this second embodiment, the arm 32 has the guide recess 36 for holding therein the cam follower 34.

Figure 6:
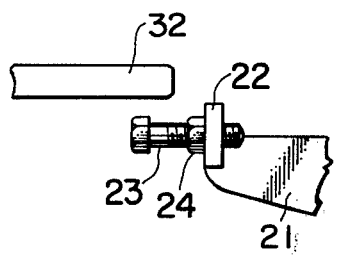

FIG. 6 is a view of a third embodiment of the present invention in which the bolt 23 with the adjusting nut 24 is mounted to the arm 21 in the horizontal state.

Figure 7:
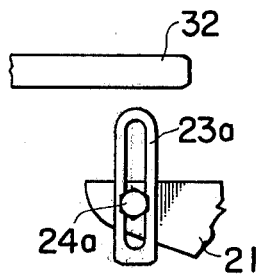

FIG. 7 is a view of a fourth embodiment of the present invention in which a plate member 23a with a slot therein is used for the bolt 23 in the first embodiment. The plate member 23a is secured to the arm 21 with a bolt 24a adjustably in height.

Figure 8:
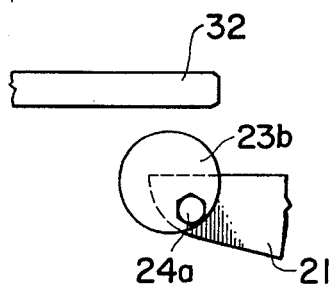

FIG. 8 is a view of a fifth embodiment of the present invention in which a disk member 23b is used for the bolt 23 in the first embodiment. The disk member 24 is eccentrically secured to the arm 21 with a bolt 24a adjustably in height.

What is claimed is:

1. A device for adjusting the rotating angle of a vessel of a dump truck, comprising a detent means having a cam portion with a guide recess therein, said detent means being pivotally connected to the vehicle body; a control valve, said detent being connected to a valve spool of said control valve, said control valve being operated by an operating lever connected to said valve spool; a first arm pivotally connected to the vehicle body and having a cam follower thereon, said first arm being urged by a spring to engage said cam follower with the cam portion of said detent means; a second arm fixedly secured to a piston rod of a cylinder for rotating said vessel; and lifting means secured to said second arm for raising said first arm when said cylinder is extended to release the guide recess from the cam follower and allow the cam follower to again engage with the said cam portion.

2. The device of claim 1 wherein said lifting means is adjustable in height whereby said first arm is raised at a predetermined angle of rotation of said vessel.

3. The device of claim 2 wherein said lifting means comprises a bolt screw threaded into said second arm.

4. The device of claim 2 wherein said lifting means comprises a plate member with a slot therein secured with a bolt to said second arm.

5. The device of claim 2 wherein said lifting means comprises a disk member eccentrically secured with a bolt to said second arm.

6. A device for adjusting the rotating angle of a vessel of a dump truck, comprising a first arm pivotally connected to the vehicle body and having a detent means composed of a cam portion with a guide recess formed therein; a second arm fixedly secured to a piston rod of a cylinder for rotating said vessel; a control valve operated by an operating lever connected to one end of a valve spool of said control valve; a member directly connected to the other end of said valve spool and having a cam follower thereon; a spring means provided between the vehicle body and one end of said first arm for urging said first arm to engage said cam follower with the cam portion of said detent means formed in said first arm; and lifting means secured to said second arm for raising the end of said first arm opposite to said one end thereof connected to said spring means when said cylinder is extended to release the guide recess from the cam follower and allow the cam follower to again engage with the said cam portion.

7. The device of claim 6 wherein said lifting means is adjustable in height whereby said first arm is raised at a predetermined angle of rotation of said vessel.

8. The device of claim 7 wherein said lifting means comprises a bolt screw threaded into said second arm.

9. The device of claim 7 wherein said lifting means comprises a plate member with a slot therein secured with a bolt to said second arm.

10. The device of claim 7 wherein said lifting means comprises a disk member eccentrically secured with a bolt to said second arm.

* * * * *